2,705,212

COMPOSITION FOR CONTROL OF MITE AND INSECT PESTS

Eugene E. Kenaga, Midland, Mich., assignor to The Dow Chemical Company, Midland, Mich., a corporation of Delaware No Drawing. Application August 8, 1949,
Serial No. 109,241

3 Claims. (Cl. 167—30)

This invention is related to parasiticides and is particularly concerned with a novel composition including as active toxic ingredients chlorinated camphene and the 4-chlorophenyl ester of 4-chlorobenzene sulfonic acid.

Chlorinated camphene is an article of commerce marketed as Toxaphene. The latter name has been accepted as a coined common name by the American Association of Economic Entomologists and other scientific and governmental bodies. This material is an isomeric mixture containing from 67 to 69 per cent chlorine and having the empirical formula $C_{10}H_{10}Cl_8$. For purpose of brevity this product is hereinafter referred to as "toxaphene."

Toxaphene is a mixed isomeric product in the form of a waxy-like solid having a melting range of from 65° to 90° C. and a density of 1.6 at 20° C. It is substantially insoluble in water and readily soluble in most common organic solvents such as acetone, benzene, carbon tetrachloride, ethylene dichloride, toluene, xylene, turpentine, and kerosene. In recent years this product has come to be recognized as an organic parasiticidal toxicant of great promise.

According to the present invention, the 4-chlorophenyl ester of 4-chlorobenzene sulfonic acid is mixed with toxaphene to obtain parasiticide compositions having very desirable properties for the control of plant parasites. When compounded with a carrier in spray or dust compositions, the mixture exerts a toxicity against mite and insect pests which is greater than additive with respect to that inherent in the constituents of the mixture when employed alone. The use of the mixture of toxicants permits the control of plant parasites with smaller amounts of the 4-chlorophenyl ester of 4-chlorobenzene sulfonic acid and of toxaphene than would otherwise be required. A further advantage resides in the prolonged residual effect exerted by the mixture. Thus a single application of the mixture gives excellent control of such organisms as *Tetranychus bimaculates* (two-spotted spider mite), *Paratetranychus pilosus* (European red mite), and *Bryobia praetiosa* (clover mite) for periods ranging up to several months. This is in part believed to result from the ovicidal properties of residues deposited on plant surfaces.

The new toxicant mixtures are commonly employed with an inert material as a carrier, e. g. a finely divided solid, water, a solvent liquid of organic origin, a wetting and dispersing agent, an aqueous emulsion, and any suitable combination of these. In such compositions, the mixture of toxicants may be present (1) in relatively high concentration to provide a concentrate adapted for further dilution to produce spray or dust compositions, or (2) in very dilute form to provide compositions suitable for application without further modification.

In the preparation of concentrates, the toxaphene and 4'-chlorophenyl 4-chlorobenzene sulfonate may be ground or otherwise dispersed with wetting and dispersing agents to obtain products adapted to be dispersed in water or other aqueous spray composition. Alternatively, the toxicants may be separately compounded in concentrate form and mixed together upon dilution in the spray tank or otherwise. In another mode of operation, the mixture of toxicants may be dispersed in a finely divided solid carrier to produce a concentrate adapted to be subsequently diluted with additional carrier to form dusts.

In the preparation of dusts, the toxicants may be mixed with finely divided carrier in any suitable manner. A convenient mode of operation comprises dissolving the toxic mixture in a volatile organic solvent, wetting the finely divided carrier with the solution, and thereafter evaporating the solvent out of the mixture. Operable carriers include volcanic ash, clays, diatomaceous earth, pyrophyllite, wood flour and the like.

Where a spray composition is desired, the 4-chlorophenyl ester of 4-chlorobenzene sulfonic acid and toxaphene may be separately dispersed in the water or other liquid carrier. Alternatively, the toxicants may be mixed one with the other and the resulting mixture dispersed in the carrier. A further mode of operation includes grinding the toxicants with bentonite, fuller's earth, or diatomaceous earth and dispersing the resulting mixture in water. Any compatible wetting or dispersing agent may be employed in the spray compositions.

Wetting and dispersing agents adapted to be employed in the various compositions as suggested above include sodium lauryl sulphate, alkyl aryl sulfonate (Oronite No. 5), dioctyl sodium sulfosuccinate (Aerosol OT), alkylated aryl polyether alcohol (Triton X-100), polyoxyethylene sorbitol oleate-laurate (Atlox 1045A), and the polyoxyethylene derivative of sorbitan trioleate (Tween 85). Other conventional additaments may be employed provided only that such agent accomplish the end desired and not be reactive with the other ingredients of the composition so as to reduce their effectiveness.

In operating in accordance with the present invention, any suitable amount of toxaphene may be employed in combination with 4'-chlorophenyl 4-chlorobenzene sulfonate to obtain compositions in which the toxicants are mutually activating. The exact amounts of the toxicants in the mixture do not appear to be critical. The preferred proportions are dependent upon the type of composition in which the mixture of toxicants is applied, the organism concerned, and the period for which the residual action and control is desired. Ordinarily, from about 0.1 to 20 parts by weight of toxaphene is employed with each 10 parts of 4'-chlorophenyl 4-chlorobenzene sulfonate. In spray compositions, the proportions of the toxicants and dosages applied should be so integrated that the content of toxaphene is at least 0.01 pound and the content of 4'-chlorophenyl 4-chlorobenzene sulfonate is at least 0.1 pound per 100 gallons. The exact amounts employed are determined by the organism to be controlled and the tolerance of the host plant for the toxicant mixture. In dusts, good results are obtained with compositions containing from 1 to 20 per cent by weight of the mixture of toxicants. With either sprays or dusts, a uniform and thorough coverage of all plant surfaces is desirable. In concentrates, the mixture of toxicants may constitute from about 5 to 95 per cent by weight of the ultimate composition.

It is to be understood that either toxic component may be employed in excess of the indicated preferred proportion. In such composition the excess of either parasiticide toxicant in no way detracts from the improved results obtainable with the basic synergistic mixture.

The 4-chlorophenyl ester of 4-chlorobenzene sulfonic acid is a white crystalline solid melting at 81°–83° C., and having the following formula:

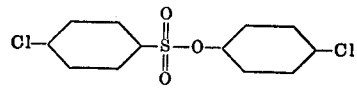

The following examples illustrate the invention but are not to be construed as limiting:

Example 1

A parasiticide composition was prepared in the form of a wettable powder by grinding 50 parts of 4'-chlorophenyl 4-chlorobenzene sulfonate, 47 parts of fuller's earth, 1 part of an alkyl aryl sulfonate (Nacconol NR), and 2 parts of compounded substituted benzoic alkyl sulfonic acids (Daxad No. 27). This product is hereinafter referred to as "Concentrate A." In a further operation, 44.7 parts by weight of toxaphene and 2.5 parts of a modified sorbitol-laurate (Atlas G–1036) were dispersed in 45.8 parts of a refined deodorized kerosene to produce a liquid concentrate hereinafter referred to as "Concentrate B."

The respective concentrates were dispersed in water to prepare spray compositions having the following concentration of toxicant per 100 gallons:

No. 1—1/32 pound of toxaphene
No. 2—2 pounds of 4'-chlorophenyl 4-chlorobenzene sulfonate
No. 3—1/32 pound of toxaphene
2 pounds of 4'-chlorophenyl 4-chlorobenzene sulfonate
No. 4—1/64 pound of toxaphene
1 pound of 4'-chlorophenyl 4-chlorobenzene sulfonate The four spray compositions were employed for the control of southern army worm on mature cranberry bean plants. In such operations, the bean foliage was wet with the indicated composition, the composition residue allowed to dry, and the plants then infested with a known number of insect larvae. 72 hours after infestation, the bean plants were examined to ascertain the degree of control of southern army worm, and the following situation expressed in per cent kill, was found to exist:

| Composition: | per cent kill |
|---|---|
| No. 1 | 40 |
| No. 2 | 5 |
| No. 3 | 95 |
| No. 4 | 80 |

*Example 2*

An aqueous spray composition containing 3 pounds of Concentrate A and 7 pounds of Concentrate B per 100 gallons, is applied as a summer spray to bearing apple trees of the red delicious variety heavily infested with a mixed population of two-spotted spider mite and European red mite. The spray is applied with a conventional spray rig at a temperature of from 75°–80° F. and in such quantity as to provide for run-off from the treated leaf, branch, and trunk surfaces. Unsprayed check plots are scattered through the orchard to provide for a continuous source of reinfestation. As a result of this treatment a commercial control of mite organisms is obtained and persists over the balance of the growing season. No significant leaf or fruit injury results from the application of the spray mixture. Unsprayed check plots continue heavily infested and display significant injury, fruit drop, and defoliation attributable to mite and spider mite attack.

*Example 3*

Concentrates A and B were dispersed in water to prepare a similar set of spray compositions having the following concentrations per 100 gallons of spray mixture:

No. 1—1/8 pound of toxaphene
No. 2—1/4 pound of 4'-chlorophenyl 4-chlorobenzene sulfonate
No. 3—1/8 pound of toxaphene
1/4 pound of 4'-chlorophenyl 4-chlorobenzene sulfonate
No. 4—1/16 pound of toxaphene
1/8 pound of 4'-chlorophenyl 4-chlorobenzene sulfonate These spray compositions were employed for the control of Mexican bean beetle larvae on mature cranberry bean plants. The application and infestation techniques followed in these operations were identical with those described in Example 1. Three days after infestation, the following percentage kills were observed:

| Composition: | per cent kill |
|---|---|
| No. 1 | 35 |
| No. 2 | 20 |
| No. 3 | 85 |
| No. 4 | 60 |

I claim:

1. A composition for the control of mite and insect pests comprising as active toxic ingredients from 0.1 to 20 parts by weight of toxaphene for each 10 parts of the 4-chlorophenyl ester of 4-chlorobenzene sulfonic acid, the active toxic ingredients of such composition being mutually activating.

2. A composition for the control of mite and insect pests comprising a carrier and dispersed therein as active toxic ingredients from 0.1 to 20 parts by weight of toxaphene for each 10 parts of the 4-chlorophenyl ester of 4-chlorobenzene sulfonic acid, the active toxic ingredients of such composition being mutually activating.

3. A spray composition for the control of mite and insect pests comprising an aqueous carrier and dispersed therein as active toxic ingredients from 0.1 to 20 parts by weight of toxaphene for each 10 parts of the 4-chlorophenyl ester of 4-chlorobenzene sulfonic acid, the active toxic ingredients in such composition being mutually activating and being present in the amount of at least 0.01 pound of toxaphene and 0.1 pound of the 4-chlorophenyl ester of 4-chlorobenzene sulfonic acid per 100 gallons of spray.

References Cited in the file of this patent

UNITED STATES PATENTS

| 2,538,513 | Kenaga | Jan. 16, 1951 |
| 2,538,728 | Kenaga | Jan. 16, 1951 |
| 2,538,729 | Kenaga | Jan. 16, 1951 |

OTHER REFERENCES

Lauger et al., pamphlet entitled "The Constitution and Toxic Effect of Botanicals and New Synthetic Insecticides," translated from Helvetica Chimica Acta, vol. XXVII, Fasciculus Quartus (1944), by the Geigy Co. (1945) pp. 1–42.

Metcalf, J. Econ. Ent., vol. 41, No. 6, Dec. 1948, pp. 875–882.

Parker et al., Univ. of Del. Agr. Expt. Station, Bulletin No. 264, Tech. No. 36, entitled "Toxaphene, a Chlorinated Hydrocarbon With Insecticidal Properties," Feb. 1947.

J. Econ. Ent., vol. 41, No. 4, Aug. 1948, pp. 548–554, 559.